United States Patent [19]

Kersting et al.

[11] 4,391,786
[45] Jul. 5, 1983

[54] PRODUCTION OF CALCIUM CARBIDE

[75] Inventors: Hans-Joachim Kersting, Frechen; Erhard Wolfrum, Düren; Willi Portz; Georg Strauss, both of Erftstadt, all of Fed. Rep. of Germany

[73] Assignee: Hoechst Aktiengesellschaft, Fed. Rep. of Germany

[21] Appl. No.: 301,836

[22] Filed: Sep. 14, 1981

[30] Foreign Application Priority Data

Sep. 17, 1980 [DE] Fed. Rep. of Germany ....... 3035026

[51] Int. Cl.³ ............................................. C01B 31/32
[52] U.S. Cl. .................................... 423/442; 423/174
[58] Field of Search ................................ 423/174, 442

[56] References Cited

U.S. PATENT DOCUMENTS

| | | | |
|---|---|---|---|
| 1,292,386 | 1/1919 | Becket | 423/174 |
| 1,374,317 | 4/1921 | Norton | 423/174 |
| 1,434,451 | 11/1922 | Reid | 423/174 |
| 2,174,900 | 10/1939 | Snyder | 423/174 |
| 2,738,256 | 3/1956 | Van Loon et al. | 423/174 |
| 3,017,244 | 1/1962 | Atwell | 423/442 |
| 3,044,858 | 7/1962 | Sage | 423/442 |

FOREIGN PATENT DOCUMENTS 750627 6/1956 United Kingdom ............... 423/442
994162 6/1965 United Kingdom ............... 423/442

Primary Examiner—Mark Bell
Attorney, Agent, or Firm—Connolly and Hutz

[57] ABSTRACT

The invention relates to a process for making calcium carbide by reacting an excess of coke with quicklime in the presence of oxygen in an oxygen-thermal furnace. To this end, the invention provides for precrushed coal to be used as starting material for coke and precrushed lime hydrate ($Ca(OH)_2$) or precrushed limestone ($CaCO_3$) to be used as a starting material for quicklime. The precrushed materials are mixed and the resulting mixture is introduced into a drying zone and freed therein at 80° to 120° C. from adhering water. Next, the warm mixture coming from the drying zone, and air, are introduced into a calcining apparatus in which the coal constituent is coked and the lime constituent is simultaneously dehydrated or decarbonized, at temperatures of 900° to 1400° C. The thermally-pretreated mixture of starting materials with an inherent temperature of 900° to 1000° C. is then directly introduced into the oxygen-thermal furnace and reacted with oxygen to calcium carbide.

6 Claims, 1 Drawing Figure

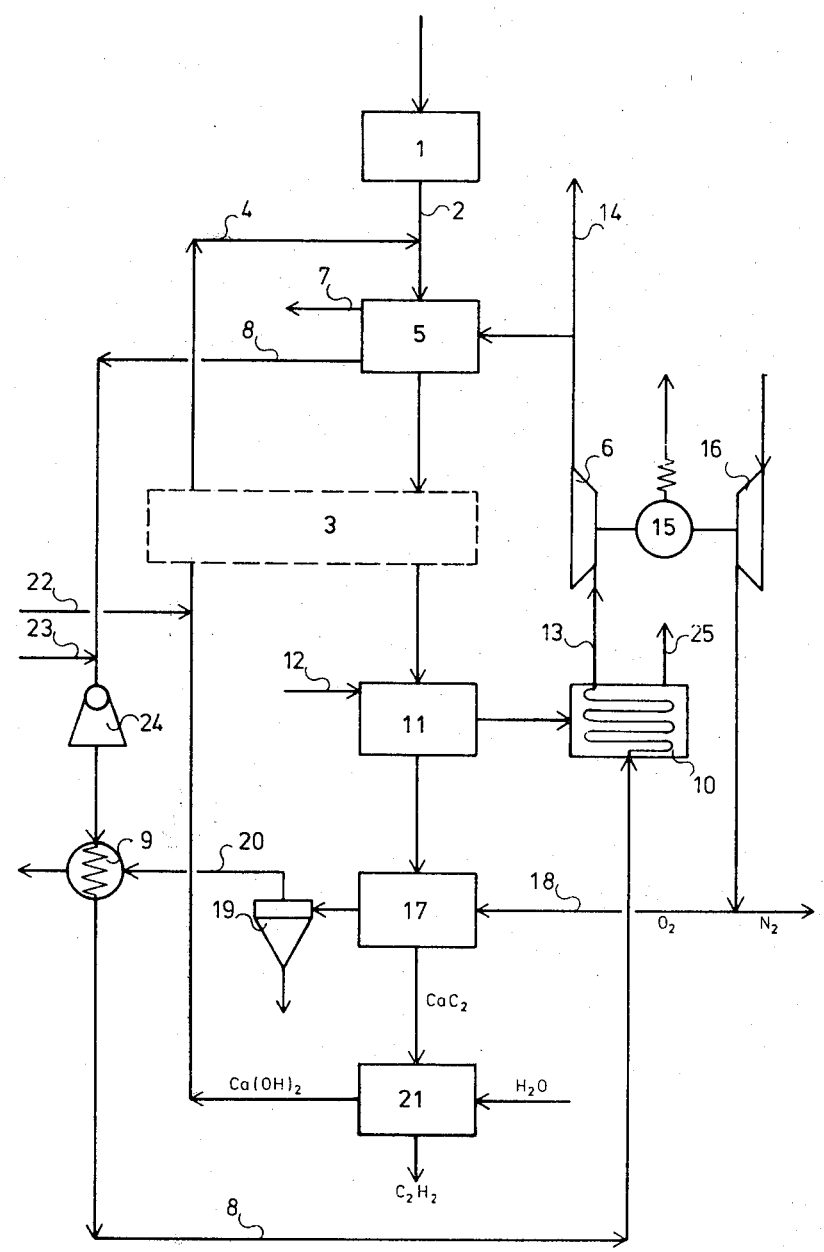

PRODUCTION OF CALCIUM CARBIDE

It has already been described (cf. Chemie-Ingenieur-Technik 28 (1956), 4-5) that calcium carbide can be produced by reacting an excess of coke with quicklime in the presence of oxygen in an oxygen-thermal furnace, also termed carbothermal furnace.

This process is however not satisfactory in respect of the following point: Unless water power is available, it is necessary for the energy needed for the recovery of oxygen from air to be produced from steam which is circulated and condensed, or from circulated gas, with a maximum theoretical efficiency of 45%, customarily between 30 and 38%.

German Patent Application P No. 29 25 897.7 filed earlier but not yet published discloses a process for making calcium carbide by reacting coke with lime in the presence of oxygen in an oxygen-thermal furnance, wherein coal is placed in a hearth furnace and coked at an off-gas temperature of at least 750° C., the resulting coke with an inherent heat still as high as 500° C. being directly introduced into the oxygen-thermal furnace for the production of calcium carbide therein with addition of lime and oxygen. The waste heat originating from the hearth furnace and oxygen-thermal furnace, respectively, is utilized for the generation of steam which in turn can be used for the production of oxygen and pre-drying the coal admitted to the hearth furnace. By so combining the above processing steps, it has been made possible to increase the efficiency to about 80%, the necessary energy being produced by means of a so-called "counter-pressure process". To this end, generated superheated high pressure steam is used for running a turbine and hot low pressure steam issuing from the turbine's "opposite side" is inter alia used for pre-drying coal. The introduction of hot coke into the oxygen-thermal furnace as disclosed in German Patent Application P No. 29 25 897.7 effects an economy of energy needed for heating the coke to feed temperature.

German Patent Application P 29 25 897.7 also provides for the hot hearth furnace coke to be mixed with quicklime (CaO) and for the resulting mixture to be admitted to the reaction zone in the oxygen-thermal furnace, the hot coke being admixed with a quantity of quicklime, which naturally becomes preheated thereby, necessary for the resulting lime/coke-mixture to assume a temperature of about 600° C. or less, ahead of the reaction zone.

The lime necessary for the production of carbide is admitted to the furnaces in the form of calcium oxide (CaO) which is made separately either by subjecting limestone (calcium carbonate, $CaCO_3$) to combustion (decarbonization) or by dehydrating lime hydrate (calcium hydroxide $Ca(OH)_2$) obtained by carbide gasification. The dehydration may be combined with a calcium cycle, if desired (so-called recycle lime).

The object of this invention is to improve the production of calcium carbide, i.e. the efficiency to 85 to 90%. To this end, the present process provides for the heat which is set free during carbide production to be used for preparing coke from coal, e.g. from green lignite, and optionally for preheating quicklime as disclosed in German Patent Application P No. 29 25 897.7, and for it to be additionally used for preparing quicklime from limestone or lime hydrate. In the present invention, use is more particularly made of the energy in excess which is produced in the proces of German Patent Application P No. 29 25 897.7 in quantities varying with the nature of coal employed, which is left unutilized therein, and delivered to condensation turbines with an efficiency just of about 35%. The present invention now provides for the above excess of energy to be used for decarbonizing or dehydrating the calcium carrier to CaO witout the need to install or operate additional facilities inasmuch as it is possible for the carbon carrier to be coked and for the calcium carrier to be dehydrated/decarbonized (calcination) simultaneously therewith, in identical apparatus, the calcining apparatus/coker (hearth furnace) being directly connected to the carbide furnace whereby CaO-rehydration is effectively inhibited.

In the process of German Patent Application P No. 29 25 897.7 and in the present process energy is produced as a result of the following fact: volatile constituents, e.g. hydrocarbons, undergo combustion on subjecting coal to coking and calcining treatment, while the coke partially undergoes combustion in the oxygen-thermal furnace upon the introduction of pure oxygen thereinto. As a result, considerable quantities of energy are set free for which it is hightly desirable to be utilized as completely and as effectively as possible.

The present invention relates more particularly to a process for making calcium carbide by reacting an excess of coke with quicklime in the presence of oxygen in an oxygen-thermal furnace, which comprises: using precrushed coal as a starting material for coke and precrushed lime hydrate ($Ca(OH)_2$) or precrushed limestone ($CaCO_3$) as a starting material for quicklime; mixing the precrushed materials, introducing the resulting mixture into a drying zone and freeing it therein at 80° to 120° C. from adhering water; introducing the warm mixture coming from the drying zone, and air, into a calcining apparatus the coal constituent being coked and the lime constituent being simultaneously dehydrated or decarbonized therein at temperatures of 900° to 1400° C.; directly delivering the thermally pretreated mixture of starting materials with an inherent temperature of 900° to 1000° C. to the oxygen-thermal furnace; and reacting it with oxygen to produce calcium carbide therein.

Further preferred features of the present process provide:

(a) for a hearth furnace to be used as the calcining apparatus;

(b) for lignite to be used as coal;

(c) for moist lignite to be crushed to material with a size of up to 10 mm and for the crushed material to be mixed with lime;

(d) for the lime hydrate or limestone to be used in the form of material with a size of up to 10 mm;

(e) for the waste heat originating from the calcining apparatus, preferably hearth furnace, to be used for the generation of superheated high pressure steam from boiler feed water;

(f) for the superheated high pressure steam to be used for operating a turbine, the latter being used for the liquefaction of air and separation into its components at low temperature so as to obtain the oxygen necessary for operation of the oxygen-thermal furnace, and also for the generation of electrical power, hot low pressure steam issuing through the turbine's opposite side being introduced at least partially into the drying zone for drying the mixture of starting materials therein;

(g) for condensate obtained in the drying zone to be taken therefrom, for it to be preheated by means of off-gases originating from the oxygen-thermal furnace, and for it to be used as boiler feed water for the generation of superheated high pressure steam by means of waste heat originating from the calcining apparatus; and (h) for lime hydrate obtained on reacting the carbide with water to acetylene to be first pelletized, if desired, and to be then recycled to the carbide production stage as a starting material for making quicklime, and for it to be mixed with precrushed coal ahead of the drying zone.

The invention will now be described with reference to the accompanying flow scheme, the process being carried out under the conditions critical for the use of lignite.

Needless to say, the invention is naturally not limited to the exemplary combination of steps described.

With reference to the flow scheme:

Moist crude coal is ground and screened or sifted in wet zone (1) to obtain material easy to dry with a size of up to 10 mm, for example. Next, calcium carrier which is conveyed through a conduit (4) and may have been precrushed in briquetting zone (3) to material with a size equally of up to 10 mm, is mixed with carbon carrier in a conduit (2), and the resulting mixture is introduced into drying zone (5). In zone (5), the carbon carrier is dried by heating it to 100° C., for example, leaving a residual moisture content of about 14 weight %. At the same time, the calcium carrier is freed from residual moisture, if any, the heat necessary to achieve this originating from low pressure steam coming from a counter pressure turbine (6). Vaporous matter which is being formed during the drying operation is removed through a conduit (7). Resulting condensate is removed through a conduit (8), compressed under high pressure by means of a pump (24), preheated in a heat exchanger (9) and introduced into waste heat boiler (10). It is also possible for the dried carbon and calcium carriers to be jointly crushed and briquetted in briquetting zone (3), lignite being briquettable without binder. In the event of the two carriers being briquetted jointly, it is naturally not necessary separately to briquet the calcium carrier. The preheated and predried mixture of carbon carrier/calcium carrier is introduced while hot into calcining apparatus (11), which preferably is a hearth furnace or compartment kiln, rotary furnace or scavenging gas furnace.

In the event of the furnace being a hearth furnace, hot air travelling through conduit (12) is introduced thereinto from above to degas the coal (coking) and separate water from the lime hydrate (calcination). This is accompanied by the combustion of volatile coal ingredients, the waste heat set free during that operation permitting incoming cold air to be heated up at once. Equally heated in the manner described is the coal/lime hydrate mixture, the transfer of energy occurring at high rates of efficiency. The coal commences liberating gas at about 300° C. up to about 900° C. At about 450° C., the lime hydrate begins to undergo dehydration to calcium oxide which is further heated up to about 900° C. The off-gases coming from the hearth furnace (11) have a temperature of about 1100° to 1400° C.

They consist essentially of nitrogen, carbon dioxide and steam and are suitably used as a heat transfer medium in waste heat boiler (10).

In the event of a coal/limestone (Ca—CO3) mixture being used, the coal is found to be subject to thermal phenomena which are substantially the same as those just described. In this case, however, it is necessary to have a calcining apparatus or hearth furnace which can be operated at bed temperatures of about 1000° C. $CaCo_3$ undergoes conversion to CaO at about 900° to 1000° C.

The waste heat originating from calcining apparatus (11) is used in waste heat boiler (10) for the production of superheated high pressure steam from feed water flowing through conduit (8), the water being passed through a heating coil disposed inside waste heat boiler (10) and being indirectly heated up by hot off-gas. The cooled off-gas leaves the waste heat boiler through conduit (25). Superheated high pressure steam maintained under a pressure of 90 bars, for example, is introduced through conduit (13) into counter-pressure turbine (6) from which superheated low pressure steam of 5 bars, for example, is at least partially recycled to the drying zone (5). The balance portion of low pressure steam is introduced through conduit (14) into a condensation turbine and converted, at a low rate of efficiency, to electric energy, or used directly for heating purposes. A corresponding proportion of feed water is supplied to the system through conduit (23) and conduit (8).

Mechanical energy produced in turbine (6) is partially converted to electric energy in generator (15), and partially used for operating an apparatus (16) permitting air to be liquefied and separated into its components at low temperature, so as to recover oxygen therefrom.

The C/CaO-mixture of 900°–1000° C. taken from the calcining apparatus (11) is directly introduced into an oxygen-thermal carbide furnace (17) which is additionally supplied with oxygen coming from apparatus (16) and travelling through conduit (18), the oxygen effecting the combustion of the coke in excess and production of the energy necessary for effecting the endothermal reaction of the following formula:

$$462 \text{ kilojoule} + CaO + 3 C \xrightarrow{>1600° C.} CaC_2 + CO$$

The off-gas, chiefly CO, is freed from dust in cyclone (19) and introduced through conduit (20) into heat exchanger (9) for heating boiler feed water. After partial cooling, the off-gas can be converted to synthetic gas, or used for heating purposes. Unless it is desirable for the calcium carbide produced in furnace (17) to be used for other purposes, it is possible for it to be gasified in carbide gasifier (21) to obtain acetylene. Lime hydrate (recycle lime) formed during that operation can be recycled through conduit (14) and mixed once again with crude coal. In the event that recycle lime is not available or that it is desirable to use limestone ($CaCO_3$) as starting material, fresh calcium carrier is admitted to the system through transport conduits (22) and (4).

EXAMPLE 1:

136.54 tons/h crude lignite (60 weight % water) was crushed in wet treatment zone (1) to particles with a size of up to 10 mm. These were mixed with 19.9 tons/h lime hydrate (particle size up to 10 mm; 2 weight % residual moisture) and the mixture was dried in drying zone (5). 63.75 tons/h dry coal (14 weight % water) and 19.5 tons/h lime hydrate were obtained. To this end, the drying zone (5) was fed with 108.6 tons/h low pressure steam maintained at 180° C. and under a pressure of 5 bars, while 73.19 tons/h vaporous matter was taken therefrom together with 108.6 tons/h condensate. In conduit (8), the condensate was mixed with 71.4 tons/h feed water flowing through conduit (23), the resulting mixture (180 tons/h) was maintained under a pressure of 90 bars by means of a pump (24), preheated to 177° C. in heat exchanger (9) and passed through the heating coil provided in waste heat boiler (10).

In hearth furnace (11), the dry coal/lime hydrate-mixture was coked/calcined with the use of 122 130 m³/h (determined at 1.013 bar and 273.15 K) with the resultant formation of a mixture of 23.51 tons/h coke and 14.74 tons/h CaO which was admitted to the oxygen-thermal carbide furnace (17). Injected thereinto was 13 789 m³/h (at 1.013 bar and 273.15 K) oxygen (98%) and 12.82 tons/h calcium carbide (standard carbide containing 80 weight % $CaC_2$) was obtained together with 37 069 m³/h (at 1.013 bar and 273.15 K) off-gas of 600° C. In hot cyclone (19), the off-gas was freed from 4.16 tons/h dust which was recycled. After having been passed through heat exchanger (9), the off-gas still was at a temperature of 200° C. In carbide gasifier (21), the carbide was gasified with water and 3846 m³/h (at 1.013 bar and 273.15 K) acetylene was obtained together with 19.9 tons/h recycle lime (2 weight % residual moisture) which was recycled through conduit (4) and mixed with comminuted crude coal.

The hot off-gases coming from hearth furnace (11) were used for heating feed water (180 tons/h; 177° C.; 90 bars) which travelled through the heating coil provided in waste heat boiler (10) to 492° C. so that it became superheated high pressure steam. Use was made thereof in counter-pressure turbine (6) and generator (15) for the production of an excess of 19.1 magawatt electrical power, and in apparatus (16) for the liquefaction at low temperature of 79 451 m³/h (at 1.013 bar and 273.15 K) air and separation of the latter into 13 789 m³/h oxygen and 65 662 m³/h nitrogen. 180 tons/h low pressure steam of 180° C. and 5 bars, of which 108.6 tons/h was introduced into drying zone (5) was obtained at the opposite side of turbine (6). The balance of 71.4 tons/h was introduced through conduit (14) into a second turbine with generator and a further excess of 4.27 megawatt electrical power was produced. Altogether 19.10+4.27=23.37 megawatt was obtained in this process.

EXAMPLE 2:

(Comparative Example in accordance with German Patent Application P No. 29 25 897.7)

The procedure was as in Example 1 save that the ground crude lignite was not mixed with lime hydrate. Conduit (4) for the transport of recycle lime was therefore omitted, but 14.74 tons/h CaO was directly introduced into furnace (17). Only 106.6 tons/h low pressure steam was required to be used for drying and heating the coal in drying zone (5), and only 106.6 tons/h condensate was accordingly required to be removed through conduit (8). 86.4 tons/h feed water was admitted through conduit (23) and the mixture (193 tons/h) was further treated as described in Example 1. 20.9 megawatt electrical power was produced in generator (15). The balance portion of low pressure steam (86.4 tons/h; 180° C.; 5 bars; corresponding to 5.17 megawatt) left the system through conduit (14). Altogether 20.90+5.17=26.07 megawatt electrical power was obtained in this process.

2.70 megawatt (=9.7 gigajoule/h) (difference of 26.07 megawatt (Example 2) minus 23.37 megawatt (Example 1)) was accordingly sufficient for completely dehydrating and preheating lime hydrate in accordance with this invention. To achieve this in the prior process, it would be necessary to use 39 gigajoule/h, on the assumption that the calcium hydroxide presents a residual moisture content of 2%.

We claim:

1. A process for making calcium carbide by reacting an excess of coke with quicklime in the presence of oxygen in an oxygen-thermal furnace, which comprises: using precrushed coal as a starting material for coke and precrushed lime hydrate ($Ca(OH)_2$) or precrushed limestone ($CaCO_3$) as a starting material for quicklime; mixing the precrushed materials, introducing the resulting mixture into a drying zone and freeing it therein at 80° to 120° C. from adhering water; introducing the warm mixture coming from the drying zone, and air, into a calcining apparatus, the coal constituent being coked and the lime constituent being simultaneously dehydrated or decarbonized therein at temperatures of 900° to 1400° C.; directly delivering the thermally-pretreated mixture of starting materials with an inherent temperature of 900° to 1000° C. to the oxygen-thermal furnace and reacting it with oxygen to produce calcium carbide therein, using the waste heat originating from the calcining apparatus for the generation of superheated high pressure steam from boiler feed water; using the superheated high pressure steam for operating a turbine, the latter being used for the liquefaction of air and separation into its components at low temperature so as to obtain the oxygen necessary for operation of the oxygen-thermal furnace, and also for the generation of electrical power, hot low pressure steam issuing through the turbine's opposite side being introduced at least partially into the drying zone for drying the mixture of starting materials therein; and taking condensate obtained in the drying zone therefrom, preheating it by means of off-gases originating from the oxygen-thermal furnace, and using it as boiler feed water for the generation of superheated high pressure steam by means of waste heat originating from the calcining apparatus.

2. A process as claimed in claim 1, wherein a hearth furnace is used as the calcining apparatus.

3. A process as claimed in claim 1, wherein lignite is used as coal.

4. A process as claimed in claim 1 wherein said coal constituent consists essentially of moist lignite, and wherein the moist lignite is crusehd to material with a size of up to 10 mm and the crushed material is mixed with lime.

5. A process as claimed in claim 1, wherein the lime hydrate or limestone is used in the form of material with a size of up to 10 mm.

6. A process as claimed in claim 1, wherein lime hydrate obtained on reacting the carbide with water to form acetylene is recycled to the carbide production stage as a starting material for making quicklime, and mixed with precrushed coal ahead of the drying zone.

* * * * *